No. 721,835. PATENTED MAR. 3, 1903.
G. F. ROCKAFELLOW & J. P. SQUIRES.
ENTRY BOOK.
APPLICATION FILED JULY 10, 1902.
NO MODEL. 2 SHEETS—SHEET 1.
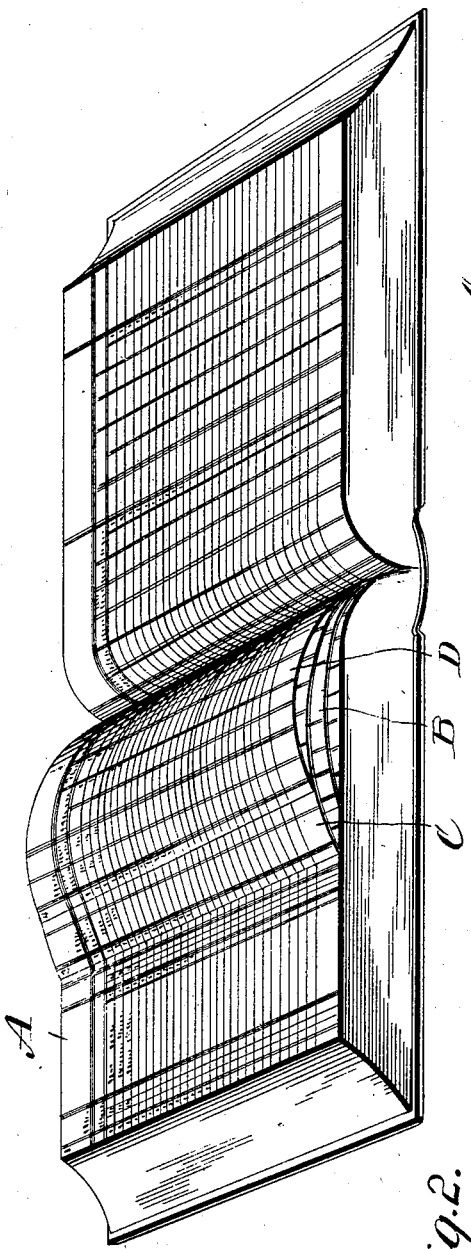
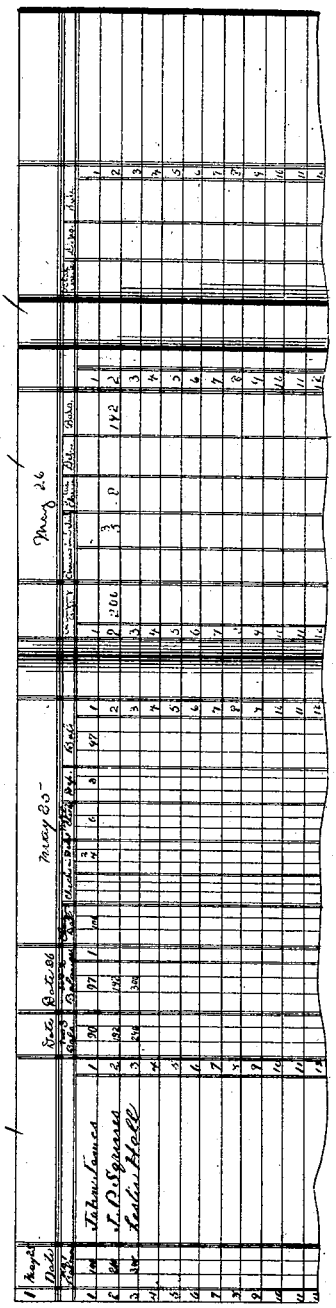
WITNESSES:
W. F. Doyle
A. L. Hough
INVENTORS
G. F. Rockafellow and J. P. Squires,
BY Franklin H. Hough
Attorney No. 721,835. PATENTED MAR. 3, 1903.
G. F. ROCKAFELLOW & J. P. SQUIRES.
ENTRY BOOK.
APPLICATION FILED JULY 10, 1902.
NO MODEL. 2 SHEETS—SHEET 2.

WITNESSES:
W. F. Doyle
A. L. Hough

Fig. 3
Fig. 4
Fig. 5

INVENTORS
G. F. Rockafellow AND
J. P. Squires,
BY Franklin N. Hough
Attorney

UNITED STATES PATENT OFFICE.

GEORGE FRANKLIN ROCKAFELLOW AND JOHN PHILIP SQUIRES, OF CANON CITY, COLORADO.

ENTRY-BOOK.

SPECIFICATION forming part of Letters Patent No. 721,835, dated March 3, 1903.

Application filed July 10, 1902. Serial No. 115,080. (No model.)

*To all whom it may concern:*

Be it known that we, GEORGE FRANKLIN ROCKAFELLOW and JOHN PHILIP SQUIRES, citizens of the United States, residing at Canon City, in the county of Fremont and State of Colorado, have invented certain new and useful Improvements in Entry-Books; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in a peculiarly-arranged book having leaves of such relative sizes with suitable rulings thereon, whereby balances may be transferred from leaf to leaf without carrying along inactive accounts from day to day, as is commonly done in well-known systems, and relates to the incorporating into a book of sets or series of leaves, each set of which contains a full-sized sheet with two shorter leaves and a single leaf between the shorter ones which is in length between the full-sized and the shortest leaves, thus enabling the operator to so manipulate the leaves as to render it a simple matter to make the necessary transfers of balances, when necessary, from one sheet to another without the necessity of utilizing perforated or creased leaves.

Our invention, comprising a novel arrangement of book and system of transferring balances from leaf to leaf, will be hereinafter more fully described, and then specifically defined in the appended claims, and is illustrated in the accompanying drawings, which, with the letters of reference marked thereon, form a part of this application, and in which drawings similar letters of reference indicate like parts in the several views, in which—

Figure 1 is a perspective view of a book, showing a set of leaves, two of which are full-sized, with two short ones intermediate the full-sized ones and a single sheet or leaf between the two short ones. Fig. 2 is a plan view showing two sheets with entries for two days. Fig. 3 is a plan view showing one of the short leaves turned back over the full-sized entry-leaf. Fig. 4 is a plan view showing the leaf intermediate the two short ones turned back upon the first short sheet for convenience in transferring from the first to the third sheet or leaf, and Fig. 5 is a similar view showing the second short leaf turned over upon the leaf intermediate the two short ones to receive the transfer of balances from the third sheet.

Reference now being had to the details of the drawings by letter, A designates the first sheet of a set, numbered 1 and of full size. This sheet has longitudinal rulings spaced apart, between which are to be written the names of the depositors of a bank, and to the left of these names are transverse rulings for the reception of a column of balances, with a space at the top for the date, and the column being designated as "No. 1 balances." To the left of the column of balances is a series of numbers identifying the names of the depositors. The sheet to the right of the spaces, in which are written the names of the depositors, is divided by transverse rulings, first into a column in which are written the numerals corresponding to the numerals at the extreme left edge of the sheet, thence into a column with a heading, "No. 3 balances," with the date, and next into a transverse column with the date at the top and a heading, "No. 2 balances," and with an adjacent column of numbers to identify the longitudinal spaces in which appear the names of the depositors. The next column to the right bears a heading "Changing balances," and next appears one or more columns with headings "Checks in detail," and adjacent to said last column a detail column in which the several checks which a depositor may draw are recorded, thence a column for the total amount of checks drawn and entitled "Total checks," next a column with a heading of "Deposits" and adjacent to it a column headed "Balances," and then a column again "Changing balances," and at the extreme right end of the sheet is a transverse column of figures to readily identify the names of the depositors when transferring the balances from sheet to sheet. Above the headings of each day's sectional ruling is written the date on which entries were made.

The second sheet, which is the first of the two shortest sheets and designated by letter B, has at the extreme left edge of the sheet the identification-numerals, then a transverse column with a heading "Changing balances," and in which column the balance of a depositor is written upon the day that the bank does business for such depositor, and next in order come the columns with headings as follows: "Checks in detail," "Total checks," "Deposits," "Balances," and over same the date on which entries are made. To the extreme right of the short page appear the identification-numerals corresponding with those previously described. Page 3 the rulings and headings on the reverse side of the leaf are similar to those just described on its other face, with the date at the top. The leaf intermediate the two short ones and designated by letter C has one face similarly ruled and having similar headings as the short leaf described, but on its reverse face has an extra column at the extreme left-hand portion of the sheet bearing a heading "No. 4 balances," with the date. This column occupies the space on one face of the leaf which projects beyond the edge of the short sheet, and when leaf C, bearing a numeral "3" in its corner, is turned down to the left, obscuring the first short leaf B, bearing a numeral "2" in its corner, the column "No. 4 balances" will rest adjacent to "No. 3 balances" column. The rulings on leaf C to the right of the column "No. 4 balances" are identical with those on the short page.

Leaf D, which is the second of the short leaves, has its face adjacent to the intermediate leaf similarly ruled, as is the other short leaf, but on its other face bearing a numeral "4." There is an extra column at the extreme left-hand portion of the page bearing a heading "Transfer balances." The second of the full-sized sheets has rulings similar to the rulings on the shortest sheets or leaves.

In making the entries in a system in which our improved book is used, for instance, we have written in line 1 the name of "John James" in the column to the left in "No. 1 balances," page 1. He has a balance of one hundred dollars for the 25th of May. As he has business that day his balance is carried forward to the "Changing balances" column on same page. He has two checks, one for two dollars and one for four dollars, which are set down in the "Detail checks" column, and the total amount, six dollars, in the "Total checks" column. He has a deposit of three dollars, which is set down in the "Deposits" column. His balance is ninety-seven dollars, which is entered in the "Balances" column. On line 2 is written the name of "J. P. Squires," who has a balance of two hundred dollars. He has no business on May 25, and consequently his balance is not carried forward. On May 26, however, he has two checks, one for three dollars and one for five dollars. His balance is therefore to the "Changing balances" column, and his balance is figured as being one hundred and ninety-two dollars at the close of the day, May 26. It will be observed that May 26 is the end of the first short leaf, and the balances must therefore be carried forward in order to use the next leaves. To do this, the balances as they are caught by the eye are carried back to "No. 2 balances" column, this being readily accomplished by glancing from line to line across the page to the right of "No. 2 balances" column, which, it will be observed, gives John James in that column ninety-seven dollars and J. P. Squires one hundred and ninety-two dollars. Lester Hall, whose name appears in the third line, had a balance of three hundred dollars, which did not change during the dates of May 25 and 26. Hence his balance is carried forward also to "No. 2 balances" column. After these balances are carried forward to this column from the right and left the next step is to turn the first short leaf and continue the work on May 27 by using the balances which appear in column No. 2. On May 27 Lester Hall and John James transact business with the bank, and their balances are carried forward into the "Changing balances" column, and their balances are figured according to the work for that day and are carried into the balance-column made for that day. This same principle of figuring is used to the end of the second short sheet and the balances which have changed are carried back to column "No. 3 balances" and the balances which have not changed are carried back to the left into No. 3 from column No. 2 and the balances are figured as before. It will be observed that on page with numeral "No. 3" in the margin thereof "No. 4 balances" column is between "No. 3 balance" column and the "Changing balances" column. This is for the purpose of transferring to page No. 4 later on. We will suppose James's and Hall's balances change on page 3. Their balances are therefore carried forward and are figured the proper way, but it is desired to transfer them to page "No. 4 balances" column, and the balances that have changed back to "No. 4 balances" column and the balance that has not changed J. P. Squires's one hundred and ninety-two dollars are carried from No. 3 column to No. 4 column. This being accomplished, the balances in "Balance column No. 4" are used to figure for work on page 4. Let us suppose the three accounts change on page No. 4. They are carried forward to "Changing balances" column, which is the second column to the right of column No. 4, and the balances are figured, after which all the balances are carried back to the "Transfer balances" column. It will be observed that then all of these balances will be in the "Transfer balances" column and are ready to be carried forward again to the second leaf of full size.

From the foregoing it will be observed that by the provision of an entry-book arranged in accordance with our invention the balances are easily brought forward from page to page without the necessity of perforating or bending the leaves, as is necessary with systems commonly in use.

Having thus described our invention, what we claim to be new, and desire to secure by Letters Patent, is—

1. An entry-book made up of series of sets of leaves, each set comprising a wide leaf and two short leaves, with a single leaf of medium length intermediate the short leaves, the inner face of the wide sheet having a plurality of appropriately-designated balances columns disclosed beyond the edge of the first short leaf, when the latter lies against the adjacent edge of said wide leaf, the headings of columns on the opposite faces of the short leaves from left to right being similarly arranged as are the headings of the entry-columns on the wide sheet which are covered by the short leaf as the latter is turned against the first wide leaf, as set forth.

2. An entry-book made up of series of sets of leaves, each set comprising a wide leaf and two short leaves, with a single sheet of medium length intermediate said short leaves, the inner face of the wide sheet having a plurality of appropriately-designated balance-columns disclosed beyond the edge of the first short leaf when the latter lies against the adjacent face of the wide leaf, the headings of columns on the opposite faces of the short leaves from left to right being similarly arranged as are the headings of the entry-columns on the wide sheet which are covered by a short leaf, as the latter is turned against the wide leaf, and an appropriately-designated balances column formed on the projecting portion of said intermediate sheet, as set forth.

In testimony whereof we affix our signatures in presence of two witnesses.

GEORGE FRANKLIN ROCKAFELLOW.
JOHN PHILIP SQUIRES.

Witnesses:
H. B. ALDEN,
L. F. REED.